(No Model.)
C. UEBELE, Dec'd.
J. M. UEBELE, Executrix.
ROCKING HORSE.
No. 336,269. Patented Feb. 16, 1886.
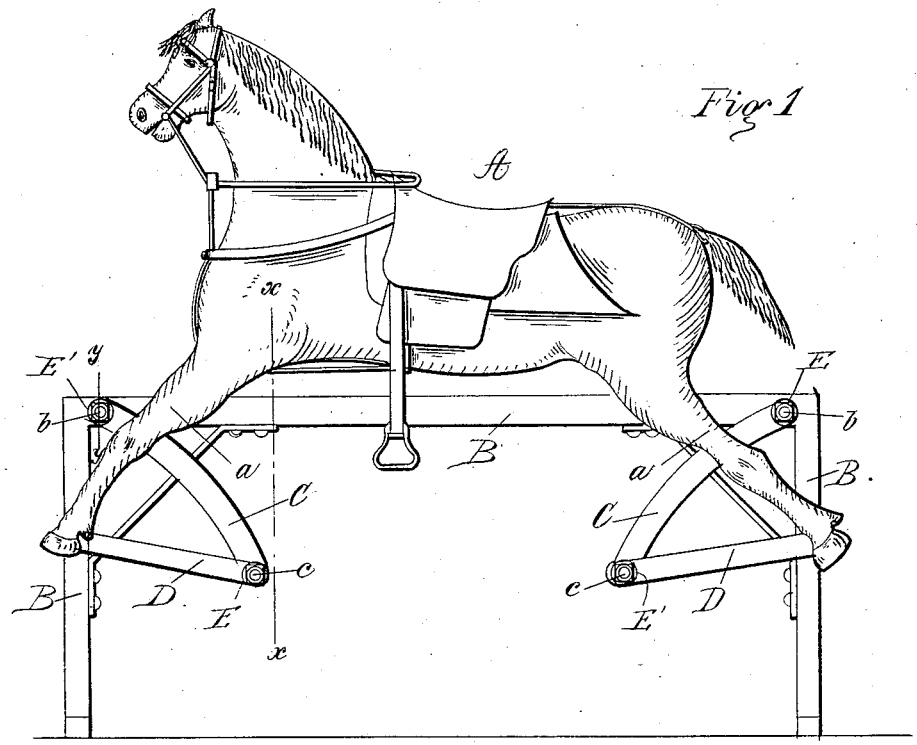
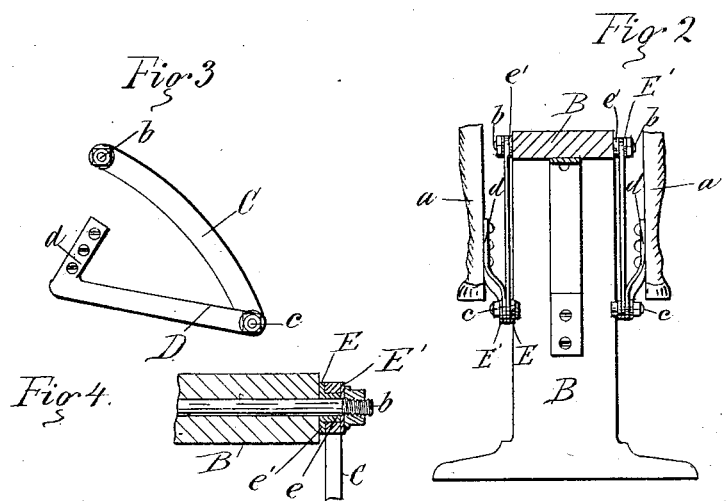
Witnesses
P. E. Renner
H. C. Coelies
Inventor
Conrad Uebele
By Coburn & Thacher
Attorneys

UNITED STATES PATENT OFFICE.

CONRAD UEBELE, OF CHICAGO, ILLINOIS; JENNIE M. UEBELE EXECUTRIX OF SAID CONRAD UEBELE, DECEASED.

ROCKING-HORSE.

SPECIFICATION forming part of Letters Patent No. 336,269, dated February 16, 1886.

Application filed August 23, 1884. Serial No. 141,329. (No model.)

*To all whom it may concern:*

Be it known that I, CONRAD UEBELE, a citizen of the United States, residing at Chicago, in the county of Cook and State of Illinois, have invented certain new and useful Improvements in Rocking-Horses, which are fully set forth in the following specification, reference being had to the accompanying drawings, in which—

Figure 1 is a side elevation of my improved rocking-horse; Fig. 2, a sectional view of the same on the line $x$ $x$ of Fig. 1; Fig. 3, a detail view; and Fig. 4, a sectional view on the line $y$ $y$, Fig. 1.

My invention relates to rocking-horses designed more particularly for the use of children; and it consists in certain novel features, which will be hereinafter described, and then specifically pointed out in the claims.

In the drawings, A represents the horse-body, and B a base of suitable size and shape to pass between the legs $a$ of the horse-body, as clearly shown in Figs. 1 and 2. Upon this base are hung in pairs, near each end thereof, links C, the said links swinging freely on the projecting ends of bolts $b$, passing through the upper portion of the base B, and having suitable nuts and washers to retain the links thereon.

To the lower end of each leg $a$ of the horse-body A is secured an arm, D, preferably by bolts or screws through a projection or lug, $d$, parallel with the inner face of the leg. These arms all project inward a short distance, and are pivotally connected at their inner ends to the lower ends of the links C by means of bolts $c$, the arms being bent inward to effect this connection, as shown in Fig. 2. It is evident that, the pivot-bolts $c$ being closer together than the pivot-bolts $b$, the motion of the horse-body will combine the ordinary motion with a swinging motion, thus producing a motion very similar to the natural motion of a horse.

In order to resist the downward strain on the links C, I make them curved or arched, as shown, this form rendering them better able to support heavy weights without breaking.

In Fig. 4 I have shown my preferred mode of connecting the links C and bolts $b$. At each end of the bolt is a thimble, E, on the same, having a sleeve portion, $e$, on which the link C is placed, and a disk portion, $e'$, which acts as a washer between the link and the base B. A washer is placed between the link and the nut of the bolt.

It is obvious that various mechanical changes in the details of construction may be made without departing from the principle of my invention, and I therefore do not wish to be understood as limiting myself to the precise construction hereinbefore described, and shown in the drawings.

I am aware of Letters Patents No. 208,531, granted October 1, 1878, to Philip Marqua, in which the bars to which the links are hinged connect the front and rear legs together instead of allowing independent movement thereof, as in my device, and I do not wish to be understood as claiming such a construction.

Having thus described my invention, what I claim as new, and desire to secure by Letters Patent, is—

1. The combination, with the rocking-horse body A, of the independent inwardly-projecting arms D, connected to the legs thereof, a base arranged between the legs of the horse, and links hung loosely on transverse bolts through said base and independently pivoted to the bars D, substantially as and for the purposes specified.

2. In a rocking-horse, the combination, with the links supporting the body, of the base having bolts $b$, provided with thimbles E, consisting of sleeve $e$ and disk $e'$, substantially as and for the purposes specified.

CONRAD UEBELE.

Witnesses:
 IRVINE MILLER,
 CARLOTTA LITTLE.